May 19, 1931. H. N. JENKS 1,805,667
WATER TREATMENT DEVICE
Filed June 7, 1926

Inventor

Harry Neville Jenks

By John P. Smith

Atty.

Patented May 19, 1931

1,805,667

UNITED STATES PATENT OFFICE

HARRY NEVILLE JENKS, OF SACRAMENTO, CALIFORNIA

WATER TREATMENT DEVICE

Application filed June 7, 1926. Serial No. 114,691.

The invention relates to improvements in water treatment devices or fluid filtering systems or plants, and is more particularly directed to the construction of a rapid sand filter, which serves as an underdrain system for the filter and distribution system for the water or other medium used in washing the filter.

One of the objects of the present invention is to provide an improved construction of a filter bottom for a fluid filtration plant or system.

A further object of the invention is to provide an improved construction of a filter bottom which will serve as an efficient distributing medium for the wash water when the filter is being cleansed.

A further object in the invention is to provide an improved construction of a filter bottom which will form a substantial and dependable support for the overlying sand bed.

A further object of the invention is to provide a construction of a filter bottom which will reduce the cost of construction as well as the cost of maintenance.

These and other objects are accomplished by providing a construction in the arrangement of the various parts in the manner heretofore described, and particularly pointed out in the appended claims.

Referring to the drawings.

Figure 1:
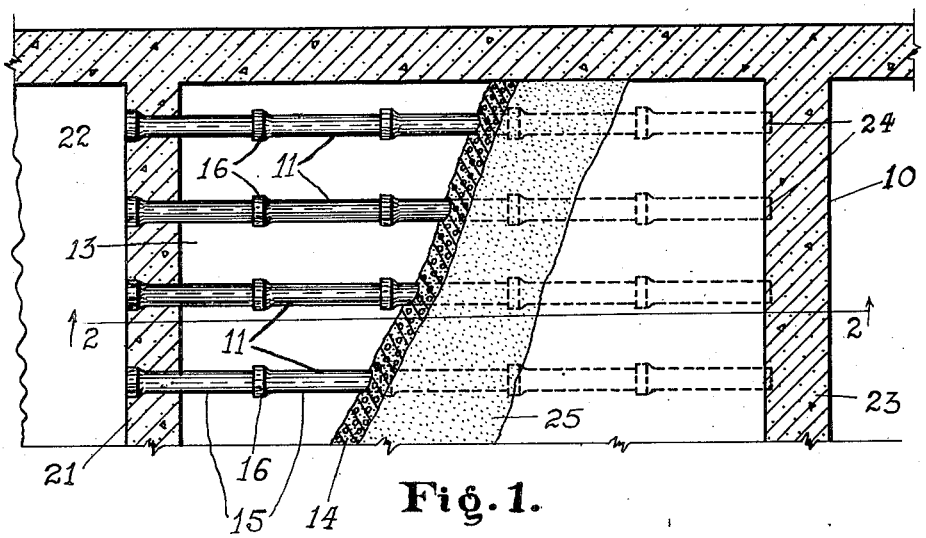
Figure 1 is a fragmentary top plan view of a portion of the filtering plant showing my improved filter bottom embodied therein, with certain portions of the filtering medium broken away for the purpose of clearness.
Figure 2:
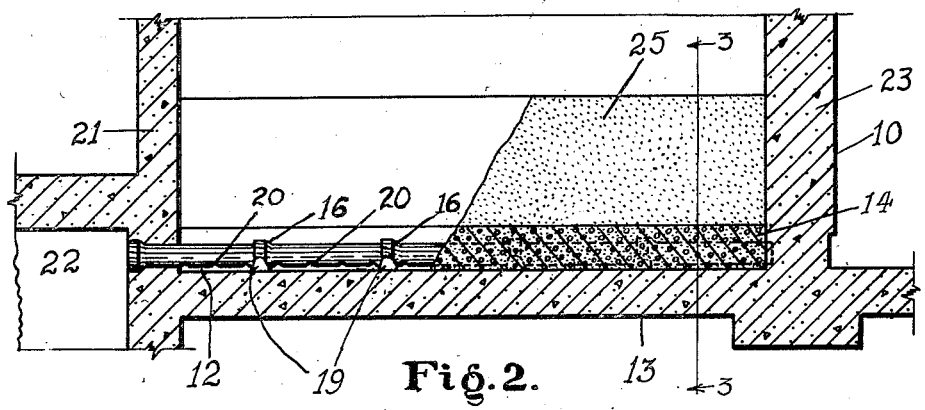
Figure 2 is a cross-sectional view taken on the line 2—2 of Figure 1.
Figure 3:
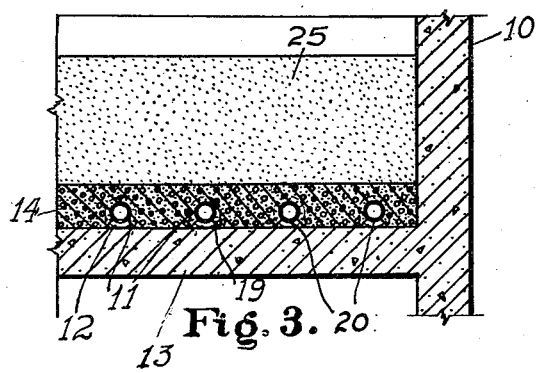
Figure 3 is a cross-sectional view taken on the line 3—3 of Figure 2.

In filtering plants or systems that have been used heretofore, of the construction in which the layers of gravel are carefully graded so that the overlying sand is kept from working its way down through the conventional gravel bed into the underdrains, particular attention is paid to the top layer which is relied upon principally to prevent the sand from getting a start on its downward course.

In these types of filter, this top layer is most easily disturbed by inequality in washing and by the sudden release of air entrained in the filter bed and underdrains, and in the attempt to provide a dependable barrier against the breaking through of the sand the top layer of gravel has in various instances been cemented together to form a porous layer between the main gravel bed and the overlying sand. Heretofore the outstanding disadvantage of this type of filter has been its structural weakness in forming a crust on the top of the graded gravel bed. With this construction there is always a tendency for failure to occur in the bending or breaking of the porous layer by the action of the upward water thrust. This is because the porous layer in this type of filter is resting on the loose gravel and only supported in position at the outer edges to the filter structure, leaving the center unsupported.

I have overcome these disadvantages by providing a construction as shown in the drawings, which involves a novel construction of a filter bottom which combines the function of the underdrain system for the filter when fluid is being filtered, and a distribution system for the wash water or other cleansing element which is introduced into the filter structure in a direction reverse from that in which the system is normally used for the filtration of fluid.

For the purpose of illustration, I have shown and described by invention in connection with the water filtration plant or system, but it will of course be understood that the same is capable of use in connection with fluids generally, such as gases, air, and liquids, and I therefore do not wish to limit myself unnecessarily. It will also be noted that while the invention is specifically adapted for a conventional, rapid sand filter, the same may be used in connection with water softening devices, such for instance, as a combined underdrain and distribution (diffusing) system, and still be within contemplation of my invention.

When my improved porous slab construction of combined underdrain and distribution system is used in connection with water softening devices as referred to in the preceding paragraph, the porous slab should be overlain by zeolite sand (the water softening material) instead of quartz sand (used for filtration). Aside from this, the structure is identical, that is, the structure of the porous slab for use as a filtration or water softening device.

In the embodiment of the invention as illustrated in the drawing, the essential component parts of one form of the invention comprise a structural filter box 10, only a fragmentary portion of which is shown in the drawing, and a system of wash water laterals or pipes 11, the number of which depends upon the size of the filtration plant. These laterals are arranged and spaced apart in parallel relation. Extending longitudinally of and underneath the laterals or pipes 11 are waterways or channels 12.

Cast monolithically between and over the underdrains or pipes 11 and bonded or secured directly to the structural floor 13 of the filter structure 10 is a porous slab 14. This porous slab 14 is preferably made of cemented gravel on account of the universal availability of the materials entering into the composition, and because of the cheapness of cost, although it will of course be understood that it is possible to make the porous slab of a cemented gravel mixture of other cement content or composition of different sizes of gravel, as well as slabs of various thicknesses. I have determined that for the economic design of the porous slab, which will insure the uniform distribution of the wash water over the surface of the slab, a thickness of about 8", and a cement to gravel ratio by volume of 1 to 9 is satisfactory, the gravel itself having an effective size of 2.1 millimeters and a uniformity coefficient of 1.36. This slab 14, when properly prepared, is sufficiently porous to permit the fluids being filtered, or the fluids for washing the filter sand, to pass therethrough, but at the same time will prevent the passage of the sand grains of the overlying filter sand bed.

The wash water laterals 11 are preferably made of vitrified clay sewer pipe, because in addition to the cheapness, this pipe may be readily embedded in the porous slab 14 and will constitute an installation that will never corrode or wear out, regardless of the type of water or other fluid that may be filtered. The laterals or pipes 11 are preferably made up of sections 15, which are provided with bell joints as shown in 16, which afford a suitable clearance above the floor 13 of the filter structure. At these bell joints cemented baffles or cut-offs 19 are preferably made, to serve as anchorages for the alignment of the pipe laterals 11 and to break at each bell joint the continuity of the channels 12 formed in the lower side of the porous slab 14. Said anchorages and cut-offs are, however, not necessarily a part of the construction. While I prefer to use perforated vitrified clay sewer pipe in my improved filter bottom, it will be understood that any suitable kind of pipe may be used to accomplish the same result.

In order to overcome a practical construction difficulty in forming longitudinally extending waterways beneath each of the laterals or pipes 11 in my improved filter bottom construction, I provide a soluble substance, such as rock salt, to form a core, having the configuration of the waterways or channels 12. When the cement mixture with the gravel becomes sufficiently hardened, the water passing through the bottom dissolves the rock salt, leaving the waterways free for the passage of the water. Between the cemented cut-offs, as shown at 19, at the bell-shaped joints of the sections 15 of the laterals or pipes 11, I have provided a plurality of spaced apart apertures or perforations 20. One end of the laterals 11 extends through the wall 21 of the filter structure 10 and connects with the main wash water manifold or channel 22, while the other end of the laterals terminate within the opposite wall 23, as shown at 24.

Mounted on my improved filter bottom or cemented porous slab 14 is a relatively thick layer of filter sand 225. I sometimes find it desirable to position between the layer of sand 25 and the porous slab 14 a loose gravel of substantially pea size.

In the operation of my improved filter bottom construction when the same is used as a filter system, the fluid being filtered is discharged into the filter structure above the surface of the filtering sand 25, through which it passes down through the porous slab 14 into the underdrains or laterals by way of the perforations 20 between the cut-offs 19. Each lateral in turn discharges its quota of filtered fluid into the manifold or channel 22.

When the filter bottom is used as a distribution system; that is, when it becomes necessary to remove the impurities that have collected in the sand bed, the sand is cleansed in situ by closing the influent or water supply pipe, and the previously filtered water is forced through the underdrain laterals in a direction reverse from that in which the system is normally used as a filter. The wash water which is forced up through the porous slab throws the sand grains into suspension, and the churning and swirling motion of the water loosens all the impurities and organic matters, which are skimmed off by wash water gutters (not shown), which are normally positioned above the sand layer 25, leaving the sand behind. When the wash water is shut off the sand bed settles down into place over the filter bottom or porous slab, in which position the filter system is ready for the further filtration of fluids.

In addition to the use of low-cost materials in construction, the installation of my filter bottom as a whole places the work of construction in the hands of the same men who do the structural concrete work of the filter unit itself, and permits the employment of the same class of materials and equipment, thus making the labor costs for installation of this filter bottom substantially less than those of other existing accepted types of filters.

While in the above specification I have described one embodiment which my invention may assume in practice, it will of course be understood that the same is capable of modification and that modification may be employed without departing from the spirit and scope of the invention as expressed in the following claims:

What I claim as my invention and desire to secure by Letters Patent is:

1. A filter bottom for a water treatment device comprising a porous filtration medium made of cemented materials, said medium having a plurality of longitudinally extending conduits, said conduits having a plurality of spaced apart apertures therein, there being a channel located beneath each conduit and communicating with its respective conduit through said apertures.

2. A filter bottom for a water treatment device comprising a porous filtration medium having a plurality of longitudinally extending spaced apart conduits, said conduits having a plurality of spaced apart apertures on one side thereof, said medium having a plurality of channels located beneath said conduits and spaced apart baffles located in said channels for breaking the continuity of said channels.

3. The combination with a fluid treatment device of a box-like cement structure having a bottom, a porous slab mounted in and secured to the bottom of said structure, a plurality of longitudinally extending laterals secured in said slab, said slab having passageways extending beneath said laterals, there being a plurality of apertures in said laterals forming communication between said passageways and said laterals and a manifold in communication with said laterals, whereby the cleansing fluid passing through said manifold into said laterals is equally distributed throughout said slab.

4. The combination with a fluid treatment device of a box-like cement structure having a bottom, a porous slab mounted in and secured to the bottom of said structure, a plurality of longitudinally extending laterals secured in said slab, said slab having passageways extending beneath said laterals, there being a plurality of apertures in said laterals forming communication between said passageways and said laterals and a manifold in communication with said laterals, whereby the cleansing fluid passing through said manifold into said laterals is equally distributed throughout said slab, or the fluid being filtered is collected in said laterals and conducted to said manifold.

In testimony whereof I have signed my name to this specification this 29th day of May, 1926.

HARRY NEVILLE JENKS.